Patented Feb. 2, 1943

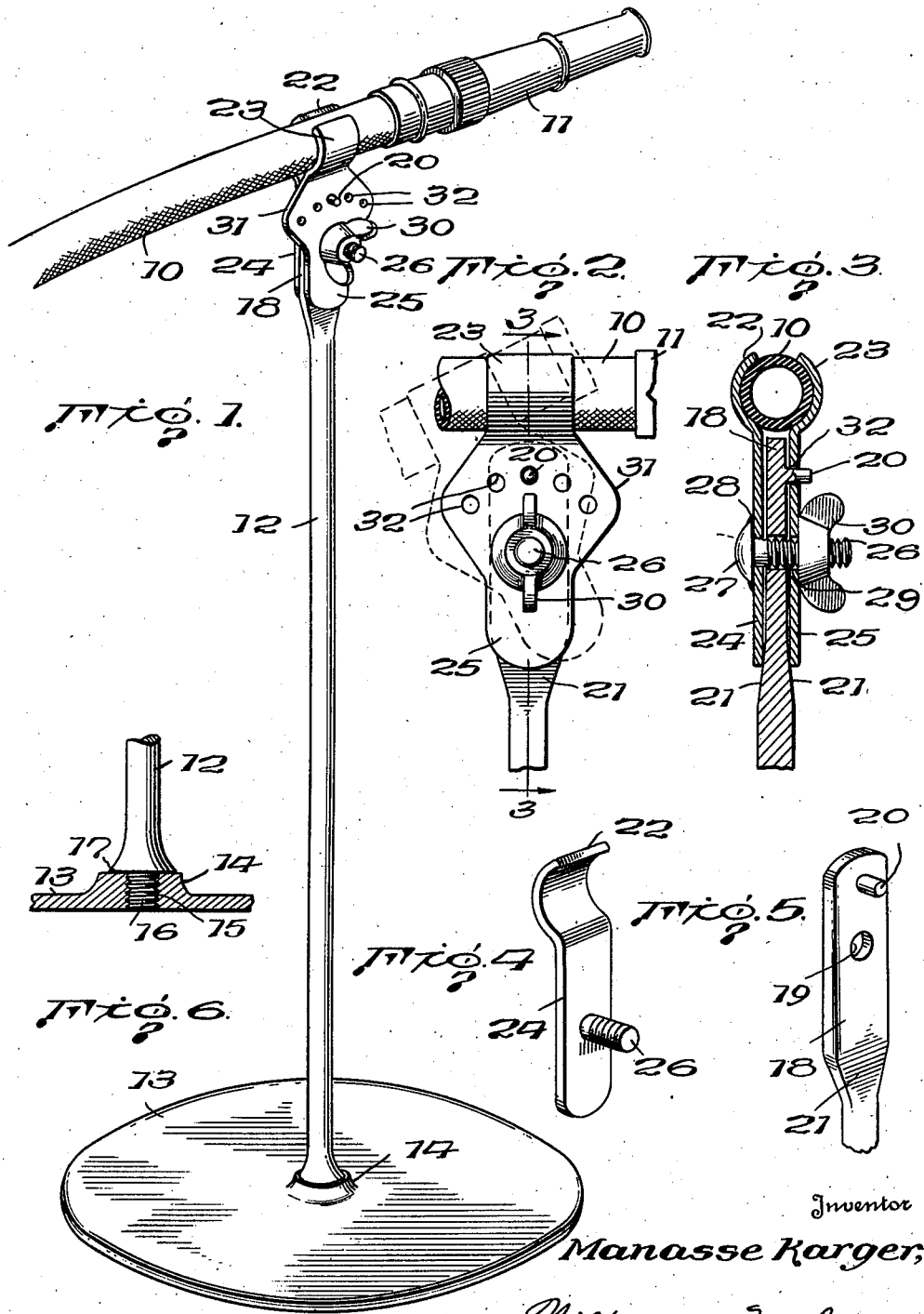

2,309,772

UNITED STATES PATENT OFFICE 2,309,772

GARDEN HOSE STAND

Manasse Karger, New Orleans, La.

Application July 10, 1942, Serial No. 450,460

5 Claims. (Cl. 248—82)

The present invention relates to improvements in garden hose stands, and has for an object to provide a stand that is easy to operate and easy to adjust and is so adjustable that the spray can be delivered at any desired angle.

Another object of the invention is to provide a garden hose stand which is movable from place to place and is so constructed and arranged that when the operator desires to move to another spot the stand will only have to be moved about an inch.

A further object of the invention is to provide an improved garden hose stand of such a nature that the operator can move this stand from place to place without getting his feet wet.

A still further object of the invention is to provide an improved hose clamp carried on the stand having an adjustable action, and which, after adjusting, may be easily tightened, after which the hose will not slip or get out of adjustment.

The invention contemplates certain details of construction for contributing more positively and economically to the above set out objects.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a perspective view of the improved garden hose stand constructed in accordance with the present invention.

Figure 2 is a side view on an enlarged scale of the clamp with portions of the hose and standard broken away.

Figure 3 is a vertical section taken on the line 3—3 in Figure 2.

Figure 4 is a perspective view of one of the members of the clamp.

Figure 5 is a perspective view of the upper flat support portion of the standard, and Figure 6 is a cross section through a portion of the base and lower part of the standard which is shown broken away.

Referring more particularly to the drawing 10 designates a hose and 11 the nozzle for watering or spraying the lawn.

The hose is arranged to be supported at a suitable elevation above the lawn or ground line by a standard or vertical upright 12 of appropriate height, and which may be of a round bar cross section of cast iron or other material.

This standard 12 is erected in a base 13 which is preferably circular and thin in a vertical sense but being of cast iron or some other suitably heavy and rigid material to possess the necessary stability.

At the center portion of the base is a boss 14 integral with the base 13 and rising up above the plane of its upper surface to add essential material and thickness at the point of the otherwise thin base through which the threaded opening 15 is made to receive the threaded stud 16 on the lower end of standard 12.

A shoulder 17 which flares out from the lower portion of the standard 12 is positioned to encounter the upper portion of the boss 14 to conceal and cover the joint and to effect binding engagement of the parts.

At its upper end the standard is flattened to provide a flat support 18 having a horizontal perforation 19 in its intermediate portion and a pin 20 projecting from one face thereof with its axis substantially horizontal and arranged above and in spaced relation from the perforation 19. Where the round cross section of the standard merges into the flat cross section inclined or cam surfaces 21 are formed. These surfaces are on both faces of the flat support 18 and form fulcrum points for the lower ends of the jaw members as hereinafter described. The hose 10 or the nozzle is clamped between clamp jaws 22 and 23 of part cylindrical complemental form to agree with the curvature of the hose or shank or other part which the same may be made to engage. These jaws are carried respectively on shanks 24 and 25. One shank 24 carries a screw 26 projecting from one face thereof and having a head projecting from the other face and being secured to such face, as by a weld or solder 28.

The other shank 25 is provided with a perforation 29 to be received over the screw 26 on which is run a wing or other nut 30. The shank 25 is formed at an intermediate part with a segment 31 over which are distributed in spaced relation a series of perforations 32 any one of which may be selectively engaged over the pin 20.

In the use of the device the clamp member 24 (Figure 4) is assembled to the upper flat part of the standard by inserting screw 26 through perforation 19 which causes jaw 22 to extend above the flat support 18 in a position to engage the side of the hose, and to cause the lower edge of the shank 24 to ride upon the cam surface 21 at one side of the flat support 18, which is the side opposite that from which the pin 20 projects. The shank 25 is now assembled to the device by slipping its perforation 29 over the screw 26 and causing one of the perforations 32 to slip over the pin 20. The wing nut 30 is then screwed upon the screw 26 and moved up into binding engagement with the shank 25. Inasmuch as the screw 26 is carried by the other shank 24, tightening of the nut 30 will cause both shanks 24 and 25 to move tightly together upon flat support 18.

As illustrated in Figure 3 when the shanks 24 and 25 are assembled in place and before the nut 30 is tightened, the resiliency of the hose 10 will have a tendency to pry apart the jaws 22 and 23 and the upper portions of the shanks, requiring that such upper portions of the shanks stand out from the flattened support 18. To enhance this initial condition the support 18 (see Figure 5), is preferably tapered upwardly so that it is thinner at its upper end than it is at the base about the cam surfaces 21. The lower ends of the shanks 24 and 25 will of course engage the cam surfaces 21 as these cam surfaces move out progressively in a downward direction, thus thickening the cross section of the member 18. In other words while the construction above the cam surfaces 21 is such as to promote gaps or spaces between the shanks 24 and 25 and the support 18, the outwardly widening cam surfaces 21 cause the lower ends of the shanks 24 and 25 to initially engage and ride as fulcrum points on these surfaces. Hence when the nut 30 is tightened the shanks 24 and 25 lever mutually toward one another to close the gaps heretofore referred to, and in so moving they pivot upon the cam surfaces 21. This produces a strong lever action which causes the jaws 22 and 23 to tightly grasp the hose. The engagement of perforation 32 on pin 20 will prevent any casual rotation of the shank 25 about the screw 26 as a center, which might allow the hose clamp as a unit to shift the nozzle axis and therefore the direction of the spray. A single pin and perforation couple will suffice because where the clamp 23 is held immovable the pressure of the hose on the other clamp jaw 22 will likewise prevent its rotation about the screw axis. Whenever it is desired to change the direction of hose axis spray, the nut 30 is loosened sufficiently to allow shank 25 to be lifted off pin 20 and then rotated about the axis of screw 26 to a position (for instance see Figure 2) where the hose nozzle will be directed in an upper or downward direction; and at the angle desired the perforation 32 of the segmental group will be slipped over the pin 20. In this way such adjustment of angularity will be preserved, it being understood that the butterfly nut 30 will be tightened after each adjustment so as to prevent any disengagement of the engaged perforation 32 with the locking pin 20 which is a fixed pin upon a fixed support. The diameters of the perforations 32 may be slightly in excess of the diameter of pin 20 to allow of the lever swinging motion heretofore described. The line of perforations 32 will be in the arc of a circle the center of which is the axis of the screw 26, as the latter is the axis of rotation adjustment for angularity of directed hose spray. It will be noted particularly that the locking pin 20 is upon the flat support 18 and this flat support is immovable, being part of the supporting standard 12 which is affixed tightly by the parts 14, 15, 16 and 17 in the base of the device. Hence the pin 20 is as immovably placed as it is practicable to do so in a device of this kind. Therefore it will effectually lock the clamp member 25 to the standard. Two features tend to avoid rotation of the companion clamp member 24; in the first place the semi or part cylindrical jaw 22 will be prevented from rotation relative to a cylindrical hose clamped therein; and in the second place the head 27 of screw 26 is non-rotatably secured at 28 to the member 24 and therefore the thread lock developed between the threads of the nut 30 and the threads of the screw 26 when the nut is run tightly home also tend to prevent rotation in the member 24, the nut 30 having a face frictional fit with the member 25 which is locked against rotation. The high frictional surface contact between the members 24 and 25 and the opposite faces of a flat member 18, particularly where the members 24 and 25 are warped into place against such member 18 by the lever action above referred to, also resists to a high degree any turning action in the member 24.

It will be appreciated that the parts are few and simple and that the clamp members may be easily and quickly assembled to the standard and clamped upon a hose and that the adjustments may be quickly and easily accomplished. Also the construction lends itself to ready lifting and moving from place to place on the lawn as successive spots for water direction are proceeded with in a systematic watering of the lawn.

It will be noted that the standard may be rotated on the screw threaded connection in the base for horizontal spray direction. In some cases the clamp members may be resilient which will enable them to warp or bow inwardly when pressure is put thereupon by the butterfly nut. In other words such resilient clamp members will be like resilient beams supported at their ends by the cam surfaces and hose and gaping away from the support toward which their central portions will be warped when the nut is turned home.

It is obvious that various changes and modifications may be made in the details of construction and design of the above specifically described embodiment of this invention without departing from the spirit thereof, such changes and modifications being restricted only by the scope of the following claims.

What is claimed is:

1. A garden hose stand comprising a standard having a flat perforated part with cam surfaces, locking means fixed to said part, clamp members for fitting at opposite sides of the flat part and so related to the flat part that the lower edges of the members are fulcrumed on the cam surfaces, a screw fixed on one member and passing through the perforated part and through the companion member, said companion member having an intermediate segment part with spaced perforations for selectively engaging said locking means, and a nut threaded on the screw.

2. A garden hose stand according to claim 1 in which the locking means is in the form of a pin.

3. A garden hose stand according to claim 1 wherein the clamp members are resilient.

4. A garden hose stand according to claim 1 further characterized by the fact that the flat perforated part of the standard is thicker at the cam surfaces and tapers towards its upper free end.

5. A garden hose stand comprising a standard, clamp members flanking the standard at its upper portion, a pin projecting laterally from the standard, a segment on one member having a series of spaced perforations to selectively engage said pin, means on which said members may rotate on the standard, and means for moving said members together on the standard and on a hose and to maintain the pin in the selected perforation.

MANASSE KARGER.